US010235251B2

(12) United States Patent
Clark et al.

(10) Patent No.: US 10,235,251 B2
(45) Date of Patent: Mar. 19, 2019

(54) DISTRIBUTED DISASTER RECOVERY FILE SYNC SERVER SYSTEM

(71) Applicant: Hitachi Data Systems Corporation, Santa Clara, CA (US)

(72) Inventors: Nathan W. Clark, Millbury, MA (US); Alan G. Bryant, East Walpole, MA (US); Richard D. Bramante, Jr., Methuen, MA (US); Alexander Vladimirov Kostadinov, Brighton, MA (US)

(73) Assignee: HITACHI VANTARA CORPORATION, Santa Clara, CA (US)

( * ) Notice: Subject to any disclaimer, the term of this patent is extended or adjusted under 35 U.S.C. 154(b) by 19 days.

(21) Appl. No.: 14/915,372

(22) PCT Filed: Dec. 17, 2013

(86) PCT No.: PCT/US2013/075840
§ 371 (c)(1),
(2) Date: Feb. 29, 2016

(87) PCT Pub. No.: WO2015/094193
PCT Pub. Date: Jun. 25, 2015

(65) Prior Publication Data
US 2016/0210204 A1 Jul. 21, 2016

(51) Int. Cl.
*G06F 11/00* (2006.01)
*G06F 11/14* (2006.01)
*G06F 17/30* (2006.01)

(52) U.S. Cl.
CPC ...... *G06F 11/1469* (2013.01); *G06F 11/1451* (2013.01); *G06F 11/1464* (2013.01);
(Continued)

(58) Field of Classification Search
USPC .................................. 714/4.1, 6.2, 6.1, 6.22
See application file for complete search history.

(56) References Cited

U.S. PATENT DOCUMENTS 6,442,587 B1    8/2002   Yoshida
8,099,572 B1    1/2012   Arora et al.
(Continued)

OTHER PUBLICATIONS

Office Action for Japan Patent Application No. 2016-541949 dated Mar. 3, 2017, 5 pages, English translation. Japan Patent Office.
(Continued)

*Primary Examiner* — Sarai E Butler
(74) *Attorney, Agent, or Firm* — Procopio, Cory, Hargreaves & Savitch LLP

(57) ABSTRACT

Example implementations are directed to restoration of data not only from the servers, but also from the clients connected to the server. Algorithms are incorporated to identify content that was created or modified after the last backup. This algorithm also identifies and resolves changes in the mount points for shared folders, preventing information leakage. When the server recovers from a failure, it notifies the clients about the recovery on their next connection. Each client then determines the current state of its mount points and file paths and compares them with the server's mount points and file paths. After the comparison, the client comprehends and indicates the mount point differences by renaming them and sends entire local data (all files, folders, mount points) to the server. The server reconciles the differences.

14 Claims, 14 Drawing Sheets

(52) U.S. Cl.
CPC .... *G06F 17/3023* (2013.01); *G06F 17/30174* (2013.01); *G06F 17/30194* (2013.01)

(56) References Cited

U.S. PATENT DOCUMENTS

| | | | |
|---|---|---|---|
| 8,200,638 B1* | 6/2012 | Zheng | G06F 11/1464 707/679 |
| 8,516,050 B1 | 8/2013 | Chapweske et al. | |
| 2005/0216788 A1 | 9/2005 | Mani-Meitav et al. | |
| 2009/0228530 A1 | 9/2009 | Anglin et al. | |
| 2009/0313503 A1* | 12/2009 | Atluri | G06F 11/1453 714/19 |
| 2012/0179522 A1 | 7/2012 | Adachi et al. | |
| 2013/0007854 A1 | 1/2013 | Sorenson, III et al. | |
| 2015/0127982 A1* | 5/2015 | Tung | G06F 11/1451 714/19 |
| 2015/0378858 A1* | 12/2015 | Ishizaka | G06F 11/1088 714/6.22 |

OTHER PUBLICATIONS

International Search Report for PCT Application No. PCT/US2013/075840, dated May 20, 2014, 2 pgs.
Extended Search Report for International Patent Application No. PCT/US2013/075840 dated Mar. 17, 2017, 11 pages, European Patent Office, Munich, Germany.

* cited by examiner

DISTRIBUTED DISASTER RECOVERY FILE SYNC SERVER SYSTEM

BACKGROUND

Field

The present disclosure is directed to storage systems, and more specifically, to file synchronization for a server/storage system during disaster recovery.

Related Art

In the related art, there are storage/server systems that involve a client network and a storage provider. A storage gateway sends update data from the client network to the storage service which stores the updated data in a volume. The data is also stored to a local data store. If something happens to the data stored in the local data store, lost data will be recovered by utilizing the data stored in the volume in the storage service.

However, the related art does not consider disaster recovery of the storage service, and also does not consider volume recovery in the storage service.

SUMMARY

Aspects of the present application include a server, which can include an interface configured to interface with a plurality of client devices; a memory configured to store information regarding a version of a first file managed by the server at a recovery point, and a processor configured to receive a plurality of files from the plurality of client devices to recover files in the server by using the plurality of files in the plurality of client devices, and for second files of the plurality of received files having a newer version than the version of the first file at the recovery point, manage one of the second files as a new version of the first file, and another of the second files as a conflict file to the one of the second files.

Additional aspects of the present application include a method for managing a server. The method may include storing information regarding a version of a first file managed by the server at a recovery point, receiving a plurality of files from the plurality of client devices to recover files in the server by using the plurality of files in the plurality of client devices, and for second files of the plurality of received files having a newer version than the version of the first file at the recovery point, manage one of the second files as a new version of the first file, and another of the second files as a conflict file to the one of the second files.

Additional aspects of the present application include a computer program for managing a server. The computer program may include instructions for storing information regarding a version of a first file managed by the server at a recovery point, receiving a plurality of files from the plurality of client devices to recover files in the server by using the plurality of files in the plurality of client devices, and for second files of the plurality of received files having a newer version than the version of the first file at the recovery point, manage one of the second files as a new version of the first file, and another of the second files as a conflict file to the one of the second files.

DETAILED DESCRIPTION

Figure 1:
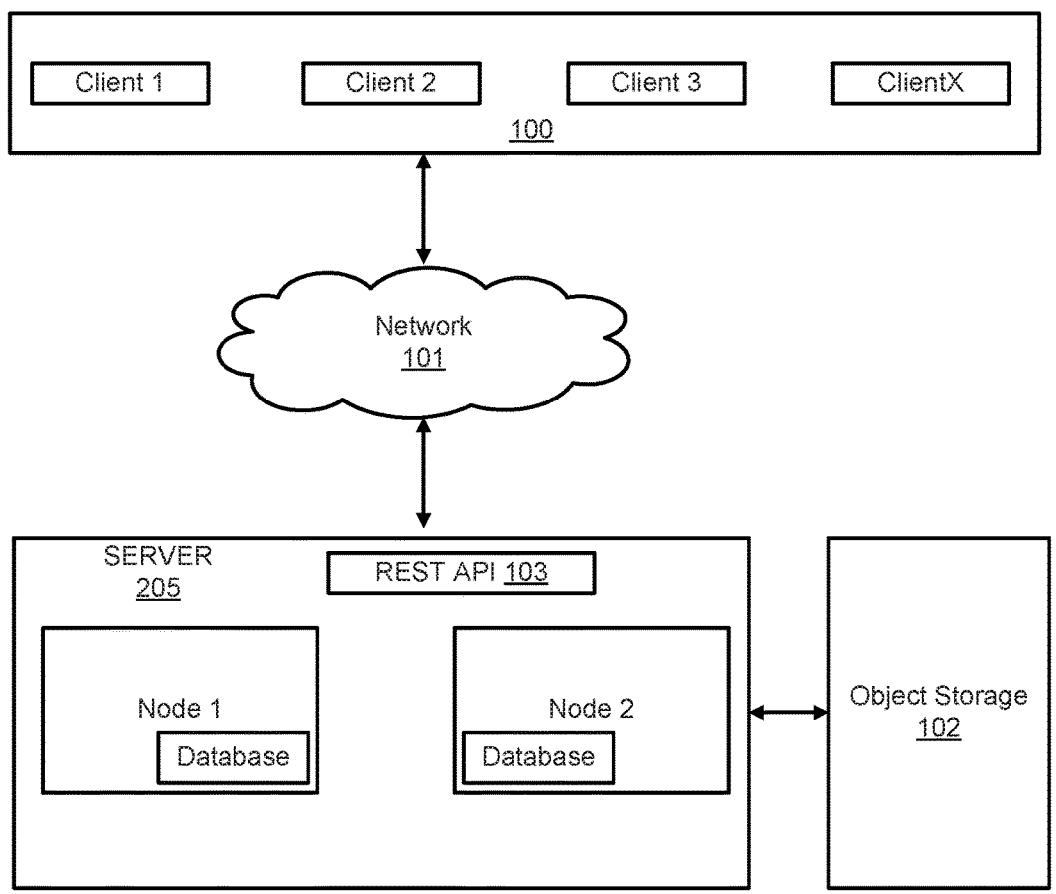
FIG. 1 illustrates an example system architecture upon which example implementations may be implemented.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. The implementations described herein are also not intended to be limiting, and can be implemented in various ways, depending on the desired implementation.

Example implementations described herein involve data restoration from the clients of a server/storage system and simplified data restores for shared folders in disaster recovery situations.

Organizations may rely on having continuous access to their data. Therefore critical systems and applications may require robust disaster recovery plans to minimize data loss in case of system failures. With the growth of unstructured non-mutable digital content, it can be challenging to manage and backup data. In a related art distributed client server system, data from the servers in the system is periodically backed up to another system. Periodic data backups may provide for minimal impact to system performance (when compared to continuous data backups), but create the potential for data loss; any data added to the system since the last backup may become unrecoverable after a failure.

FIG. 1 illustrates an example system architecture upon which example implementations may be implemented. The system architecture may involve a server 205 as described in FIG. 2, which may be configured to manage one or more nodes corresponding to one or more databases. The server may maintain an object storage 102 (e.g., storage system or other external storage) to store data corresponding to the database managed by one or more nodes in the server. The server may interact with one or more clients (client computers 100) over a network 101. The client and server may interact with each other via a representational state transfer (REST) application programming interface (API) 103. During steady state operation there may be clients periodically communicating with a server. The clients synchronize files with the Server by sending new file contents to the server and receiving updated files from the Server. All clients for a given user synchronize the same set of files. Clients for different users synchronize files for those users. Details of the server are explained in FIG. 2. Each client includes a processor, a memory, a storage derive, and the processor in the client can be configured to facilitate one or more implementations as described, for example, in FIG. 4A.

Figure 2:
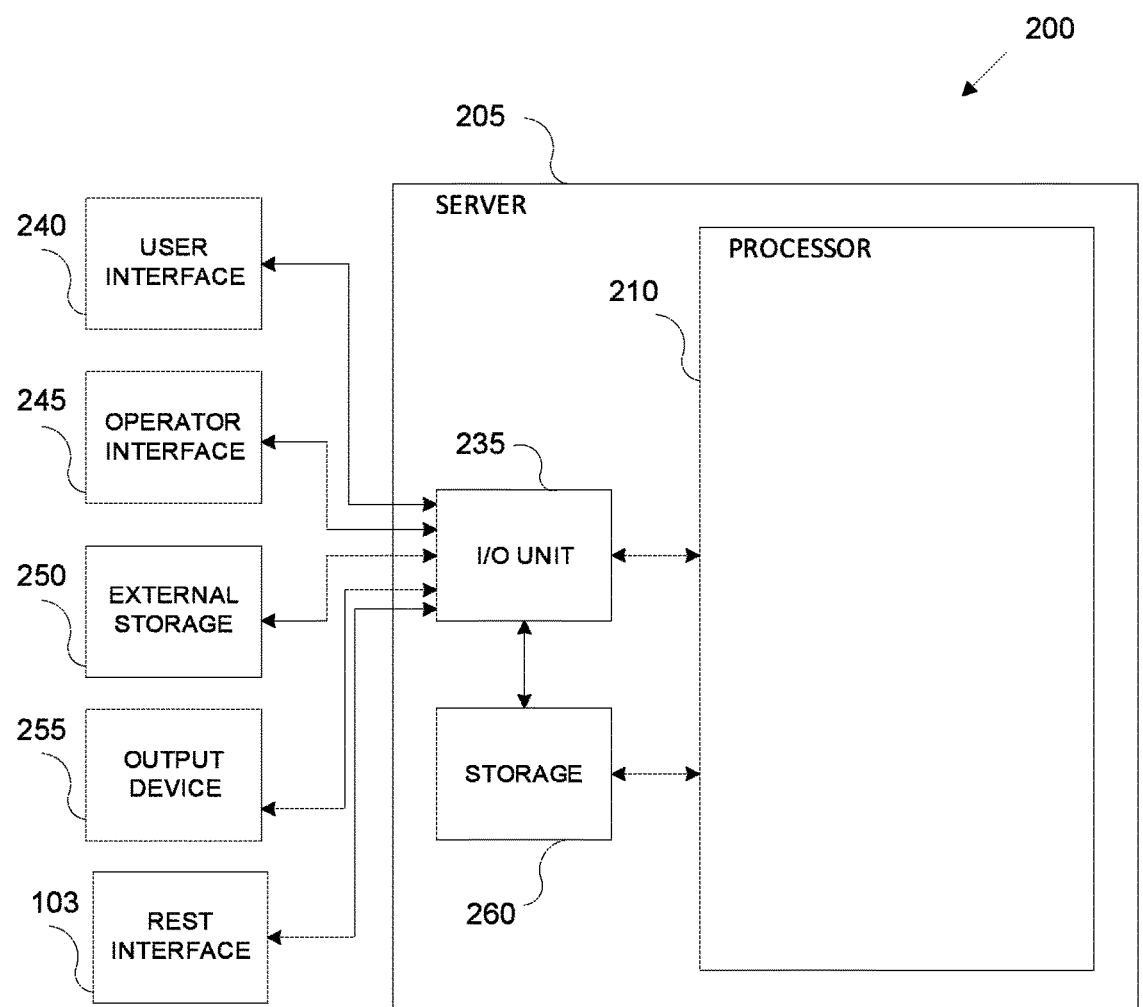
FIG. 2 illustrates an example computer system upon which example implementations may be implemented.

FIG. 2 illustrates an example computer system 200 on which example implementations may be implemented. The computer system 200 includes a server 205 which may involve an I/O unit 235, storage 260 (and/or memory), and a processor 210 operable to execute one or more units as known to one of skill in the art. The server 205 as illustrated in FIG. 2 represents a configuration involving one node, but the server can have additional nodes as illustrated in FIG. 1. Server 205 may interface with one or more clients associated with the service via an interface such as REST interface 103. The term "computer-readable medium" as used herein refers to any medium that participates in providing instructions to processor 210 for execution, which may come in the form of computer-readable storage mediums, such as, but not limited to optical disks, magnetic disks, read-only memories, random access memories, solid state devices and drives, or any other types of non-transitory media suitable for storing electronic information, or computer-readable signal mediums, which can include media such as carrier waves. The I/O unit processes input from user interfaces 240 and operator interfaces 245 which may utilize input devices such as a keyboard, mouse, touch device, or verbal command.

The server 205 may also be connected to an external storage 250 (e.g., such as the object storage 102 as illustrated in FIG. 1), which can contain a storage such as a storage system (RAID system, or DISD array), portable hard drive, optical media (CD or DVD), disk media or any other medium from which the server 205 can read data. The server 205 may also be connected to an output device 255, such as a display to output data and other information to a user, as well as request additional information from a user. The connections from the server 205 to the user interface 240, the operator interface 245, the external storage 250, the interface 103, and the output device 255 may via wireless protocols, such as the 802.11 standards, Bluetooth® or cellular protocols, or via physical transmission media, such as cables or fiber optics. The output device 255 may therefore further act as an input device for interacting with a user.

Figure 4A:
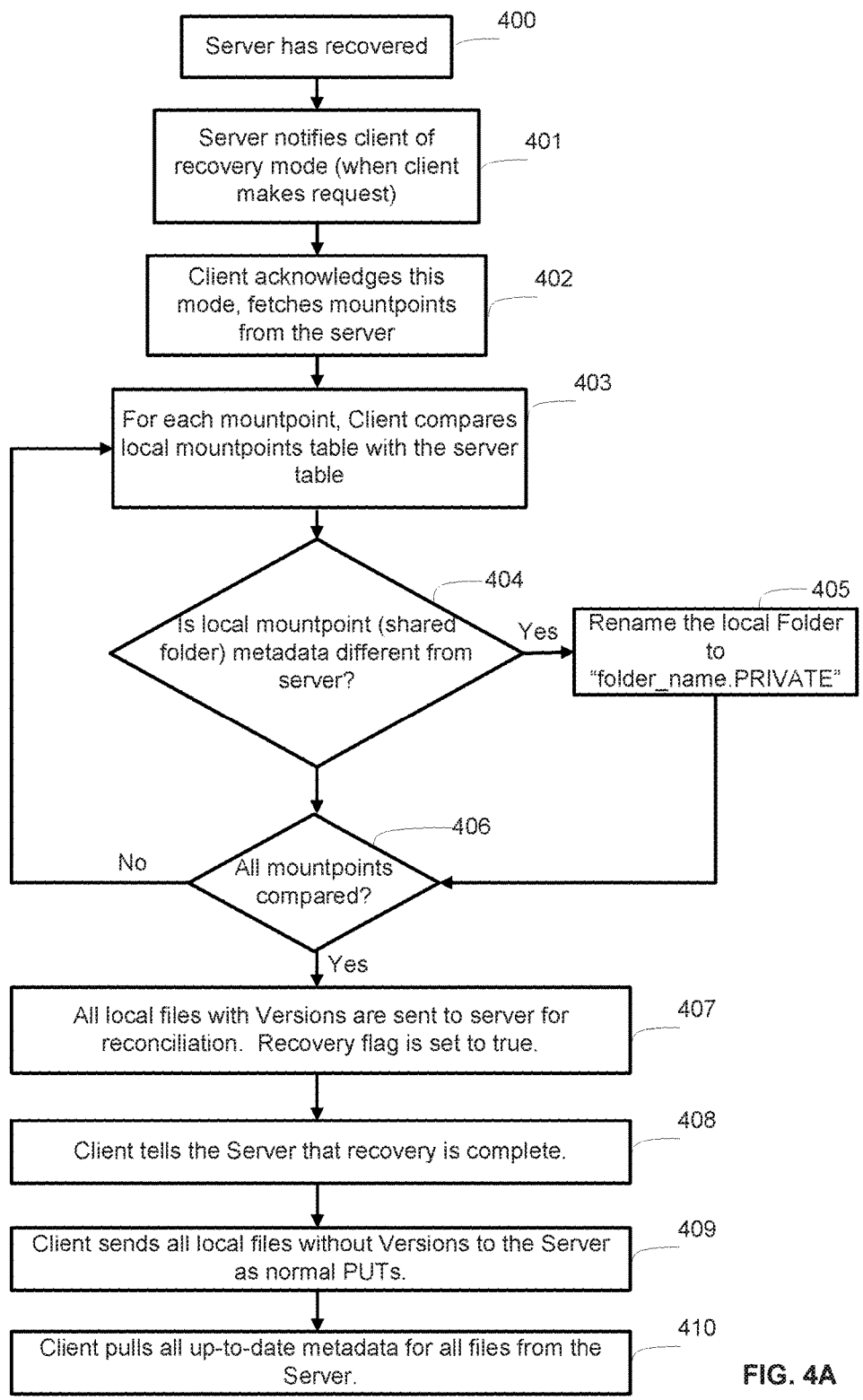
FIG. 4A illustrates a flowchart in accordance with an example implementation.
Figure 5A:
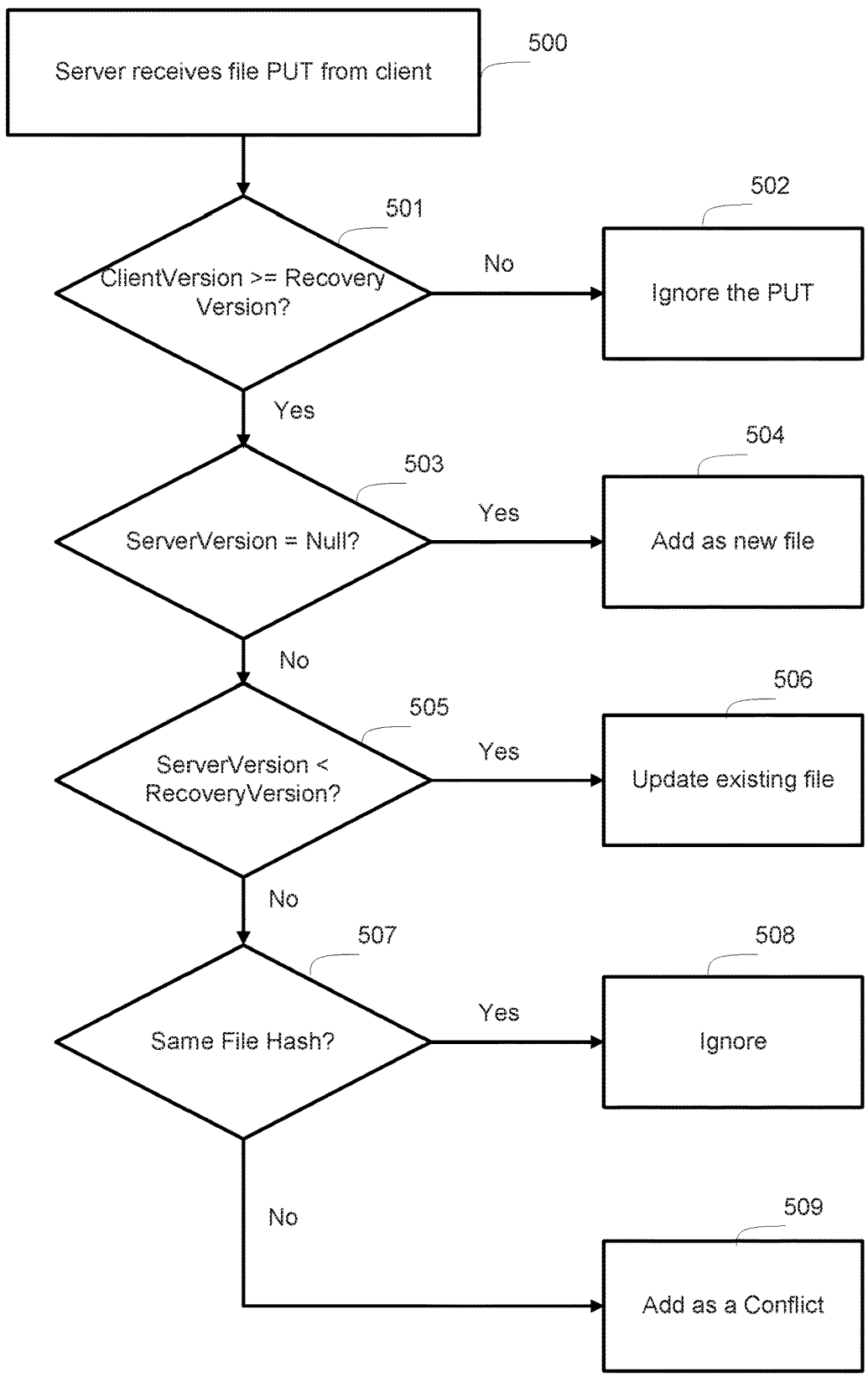
FIG. 5A illustrates the flowchart for a recovery PUT, in accordance with an example implementation.
Figure 5B:
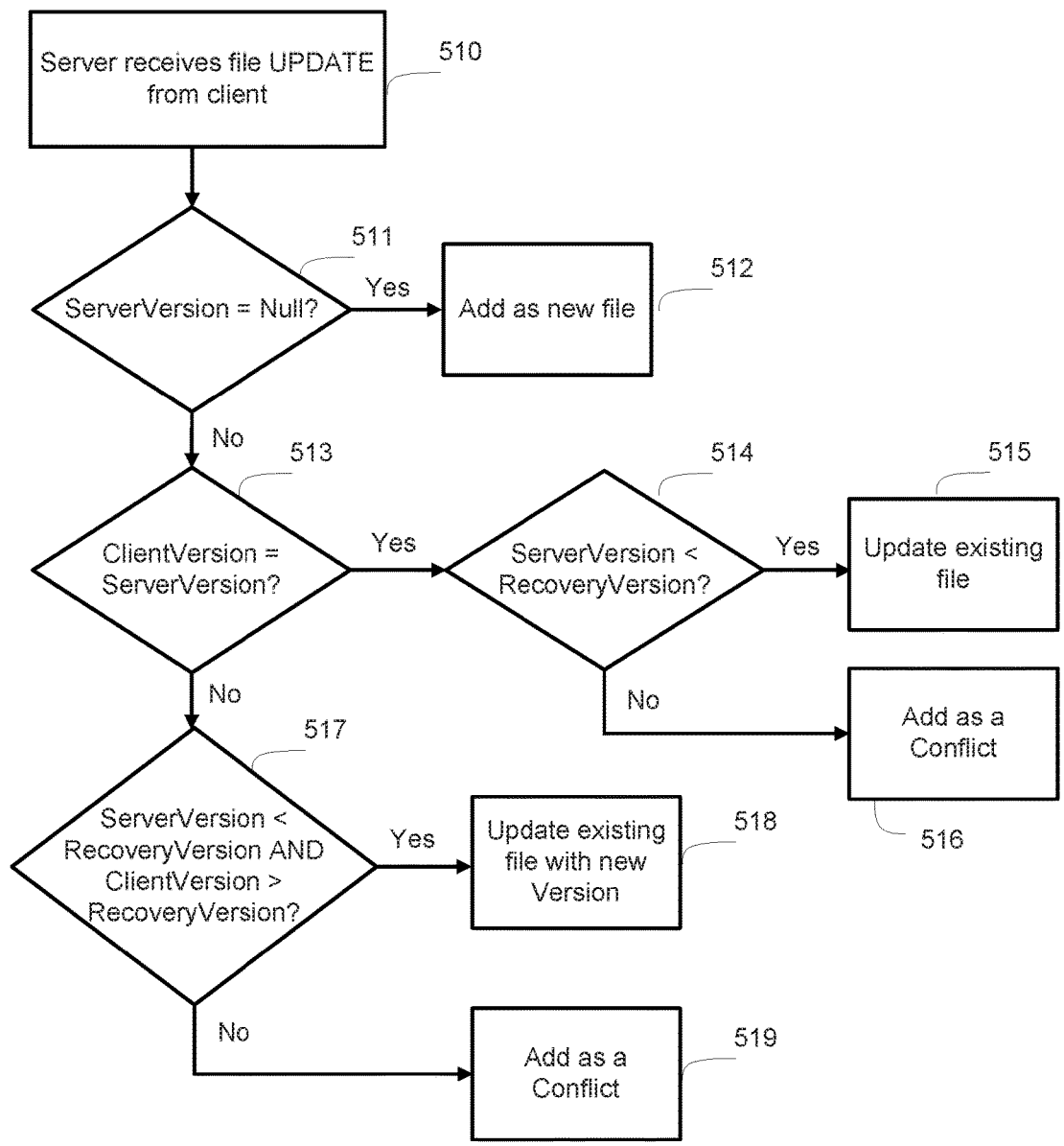
FIG. 5B illustrates the flowchart for a recovery UPDATE, in accordance with an example implementation.

The processor 210 can be configured to facilitate one or more implementations as described, for example, in FIGS. 4A, 5A and 5B. The processor may process determinations as described in FIGS. 5A and 5B to recover the server from the client devices and process client recovery files and file updates from the client after the server recovery. If the server 205 fails (e.g., due to faults or accidents on the server), then the server will execute a recovery process to perform server recovery. This process may include utilizing backups or snapshots stored in the storage system (e.g., implemented as storage 260 or external storage 250), to recover files and roll back the server 205 to a previous backup point, and determine that the point is a recovery point. Namely, the recovery point means a point just after executing a recovery process by utilizing backups or snapshots stored in the storage system, and before executing a recovery process by utilizing data in clients. After the recovery, the server 205 may then communicate with one or more clients to update or add files from the client to complete synchronization with the clients. In an example implementation, storage 260 may take the form of a memory configured to store information regarding a version of a first file managed by the server at the recovery point and information regarding files of the server.

When the server has completed the recovery, the server may start to interface with one or more clients via the interface 103 to receive files from the clients for the recovery. Processor 210 may thereby be configured to receive a plurality of files from the plurality of client devices to recover files in the server by using the plurality of files in the plurality of client devices, and for second files of the plurality of received files having a newer version than the version of the first file (e.g. a corresponding file in the server at the recovery point), manage one of the second files as a new version of the first file, and another of the second files as a conflict file to the one of the second files. Further details are provided in FIGS. 5A and 5B.

Processor 210 may be configured to generate a conflict file based on determinations as illustrated in further detail in FIGS. 5A and 5B. After a server recovery, the processor may receive and process a file PUT in the form of a client recovery file to recover file from clients or a file UPDATE in the form of an updated client file when clients submit an update to the server. When the client recovery file or updated client file correspond to one of the files of the server stored in the storage, a conflict file may be generated depending on a determination. The conflict file is generated when the determination is indicative of storing the client recovery file or updated client file as a conflict file. The determinations are made on the client update file or the client recovery file based on the flowcharts of FIGS. 5A and 5B. The contents associated with the client recovery file or the updated client file are used to generate the content file. For example, the updated client file (file UPDATE) and the client recovery file (file PUT) may not have the actual file contents and may be an index to a file stored on the client. In such an example implementation, the server retrieves the file contents from the client as indexed by the updated client file or the client recovery file to generate the conflict file. Alternatively, the contents may also be attached with the updated client file or the client recovery file.

Processor 210 may also be configured to store the received file or update when the file does not correspond to the files managed by the server. When the file does not correspond to the files managed by the server, the file can be inferred to be a new file that was not previously managed by the server, or was otherwise lost when the server recovered. The contents of the file can then be retrieved and stored in storage 260 or external storage 250, depending on the implementation of the server and associated storage system. Further details are provided in FIGS. 5A and 5B.

Figure 3:
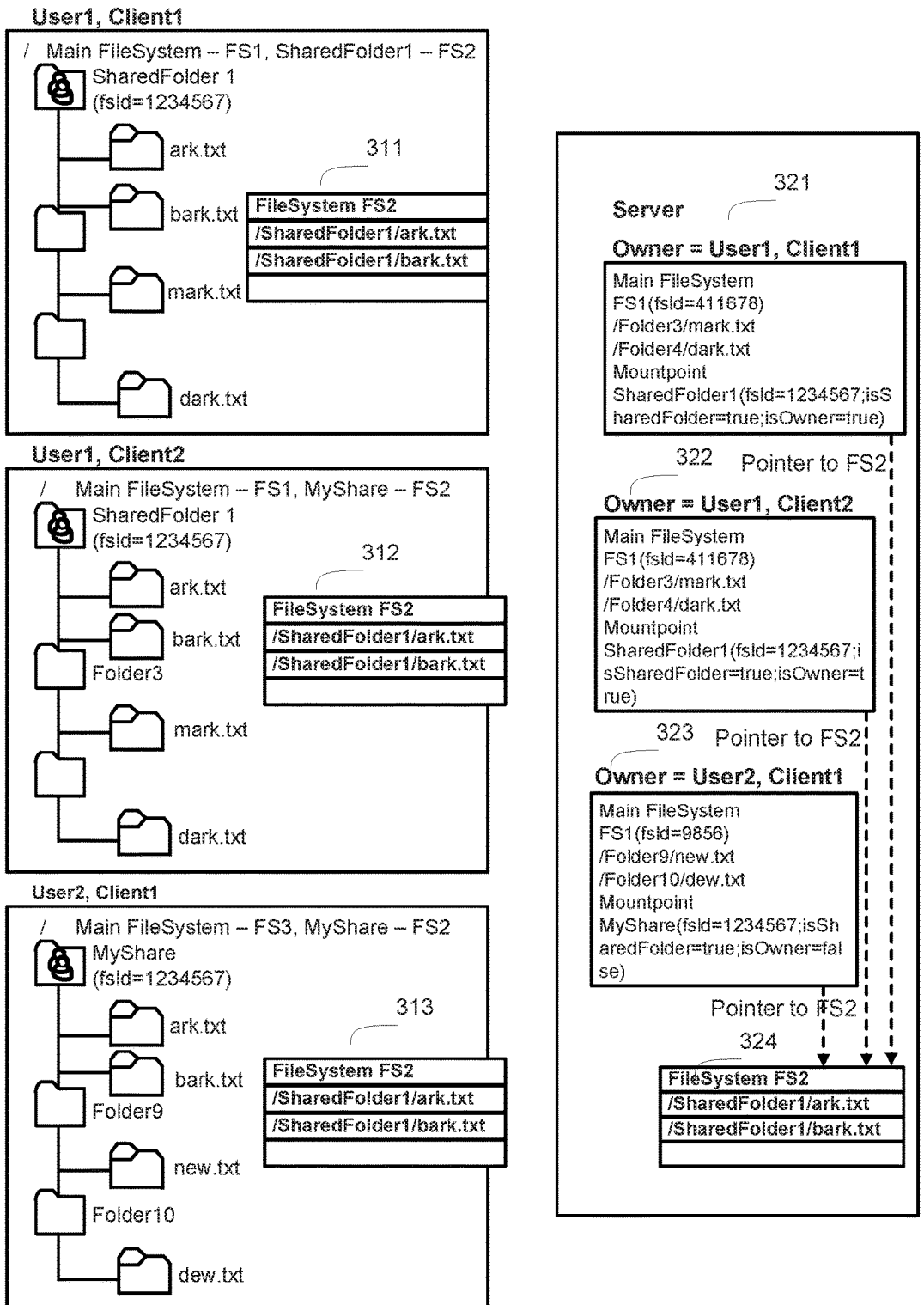
FIG. 3 illustrates an example client and server view of a file system and mount points, in accordance with an example implementation.

FIG. 3 illustrates an example client and server view of a file system and mount points, in accordance with an example implementation. On the server, the folders and the files belonging to a user are organized into a file system. Information regarding the file system is stored in the storage 260 or other memory devices in the Server 250. Each file system has a unique identifier, illustrated in FIG. 3 as "fsId". File systems contain files and folders. Each user has their own private file system that is the base (or root) of all paths for that user. Reference numerals 321, 322, 323 in FIG. 3 show one example of a server table for private file system, and each server table is stored in the storage 260. Each server table for the private file system contains the file system identifier of the private file system, path name for each file in the private file system, and metadata of mount point for the related shared folder. The metadata includes a path of the mount point and a share identifier (fsId) of the mount point. For example, as for the server table 321 of User1, Client1, the file system identifier of the private file system is "411678", path names for all files in the private file system are "/Folder3/mark.txt" and "/Folder4/dark.txt", a path of the mount point for the related shared folder is "/Shared-Folder1", and share identifier (fsId) of the mount point is "1234567". On the client, this folder is mapped to a single top-level folder. Each file has a version, which is a number that increases with each change to the file. In addition, a secure hash is kept of each file. If two files have the same hash, they are assumed to have the same contents (i.e. are not different from each other), and the system can avoid transferring or storing duplicate files.

Users may also share folders. On the server, shared folders are independent file systems. Reference numeral 324 in FIG. 3 shows one example of a server table for a shared folder, and the server table for the shared folder is stored in the storage 260. These shared folders are mapped into the private file systems of the users by creating a folder with a share identifier (e.g. SharedFolder 1), and a piece of metadata attached to the folder. The metadata is managed in the server table for the private system as explained above. The share identifier is the file system identifier of a shared folder. On the client, a local mount point table for the shared folder includes the path of the mount point for the shared folder and the share identifier (fsId) for the shared folder, and is stored in the memory of a client. Mount points for different users can have different names. The share identifier is an opaque token to the client and contains the file system identifier. The client treats any folder with a share identifier as a shared folder mount point. Moreover, the storage 260 in the server 250 stores version information for each file which is stored in the server 260, and the information is utilized in the process of FIGS. 5A and 5B. Moreover, the memory in the client also stores version information for each file which is store in the client.

When clients send changes to the server for each file, they include the previous version of that file as a "basis version". If this basis version does not match the current version of the file on the server, the server creates a conflict file with the new contents. The conflict file names can have a unique format to clearly identify them for the user, such as "filename (username's conflict on yyyy-mm-dd).file-extension".

In the example of FIG. 3, a user (User1) registers a client and creates the folder structure with one shared folder and one private folder. User1 registers another Client2 and Client2 will see the same view as Client1 and server. User2 registers a client and User1 shares folder "SharedFolder1" with User2. User2 renames "SharedFolder 1" to "MyShare".

Recovery

In circumstances of failure, a server could be completely lost and would have to be restored from a backup. In this situation, the clients that were in sync with the server before the recovery will be "ahead" of the server. The clients have changes that the server does not. File versions will be higher than the versions of those files on the server. If the clients directly updated their state from the server, the local changes can all be lost. In FIGS. 4A, 5A, 5B, if the server or the client are subject of a process, a processor in the server or client can execute the process by executing software stored in a memory (e.g. a storage). If a failure occurs on the server (or the external storage), the server recovers a file system in the server by utilizing data stored in the storage 260 and/or the external storage 250. After that, the server communicates with each client and executes a recovery procedure as described in FIG. 4A, FIG. 5A, and FIG. 5B by utilizing data stored in each client.

FIG. 4A illustrates a flowchart in accordance with an example implementation. In the example flowchart, there is a renaming of folders with ".PRIVATE", which occurs when there is change to the path for mount points or share identifiers. For example, the client changes share identifiers in the local mount point, when the status of the folder is changed from "Share" to "Private". The example implementation as depicted in FIG. 4A illustrates a flowchart for handling server recovery, which utilizes information from the client to conduct the recovery.

After self-recovery of the server (400), server notifies any requesting clients that the server is in recovery mode (401). The client acknowledges the recovery mode and proceeds with a recovery procedure which involves fetching the server table for the private file system of the client and the server table including metadata for the shared folder as explained above, from the server (402). The client can obtain metadata for the related shared folder by fetching the server table or by fetching other information which includes the metadata. The example implementation of the recovery procedure is conducted so that the server may end up with the most recent contents of all files, and no files are lost or deleted. Further, the recovery procedure facilitates having the client end up with the correct files for the user, in synchronization with the server. The example implementations may also prevent files from being written to unintended shared folders, which could leak data to unintended users.

The client can perform the following procedures for recovery. The client compares its current local mount point table with the metadata in the server table for each mount point for shared folder (403) and determines if the metadata in the local mount point table is different from the server metadata (404) in the server table. Renaming of the mount point to ".PRIVATE" occurs when either the path of the mount point or the mount point share identifier of the local mount point table is different from that of the server table (405). (For example, the path of the mount point changes or the mount point share identifier changes locally in the client.) Share identifiers are unique Ids and are opaque to the client. So for every mount point in the mount point list on client is compared to the list on server. Thus, if the path or share identifier for any is different, the client renames those mount points.

If the share identifier for a local mount point metadata (e.g. shared folder) on the client is different from the mount point metadata on the server (metadata includes path of mount point or share identifier of mount point) (Yes), the client renames these mount point names by appending ".PRIVATE" or another suffix to the end of the original mount point names, removing the local share identifier, and making the corresponding mount points into regular folders (e.g. private folders) (405). Later, these folders will be sent to the server as new files and folders. The new name indicates to the user that there are conflicts in the share state attribute of the folder and they may share the folder again.

The completion of the comparison of mount points of shared folder occurs when all of the mount points have been compared (406). If the mount points have not all been compared (No), then the comparison is reiterated with the next mount point (403). Upon completion of the comparison (Yes), the client traverses the entire local state and sends all local items (e.g., files, folders, mount points) that have a version (e.g., were in sync at one point) to the server with a recovery flag set to true (407). The recovery flag is not required to be a Boolean flag; other implementations are also possible depending on the desired implementation. For example, one example implementation can involve values of 'recoveryPut' (PUT) or 'recoveryUpdate' (UPDATE) depending on whether or not the client managing the file has local changes since the last time the client was in sync with the server. The sending of local items and synchronization process with the server involves a REST API PUT which has information about filename, file path, hash and size of each file. It could also contain contents of the file if the server does not already have them. The server reconciles these PUTs with existing state. The details of the recovery PUT are further described with respect to FIG. 5A.

Upon reconciling all of the PUTs, the client informs the server that recovery has been completed (408). The client then sends all local files that did not have a version (e.g., were never in sync with the server) to the server as normal operations or PUTs (409). These files get added to the server the same as in steady state. This step includes any folders renamed by the earlier processes to ".PRIVATE". The client then pulls all metadata about all of the files of the user from the server (410). This brings the client up-to-date with the server state.

Figure 4B:
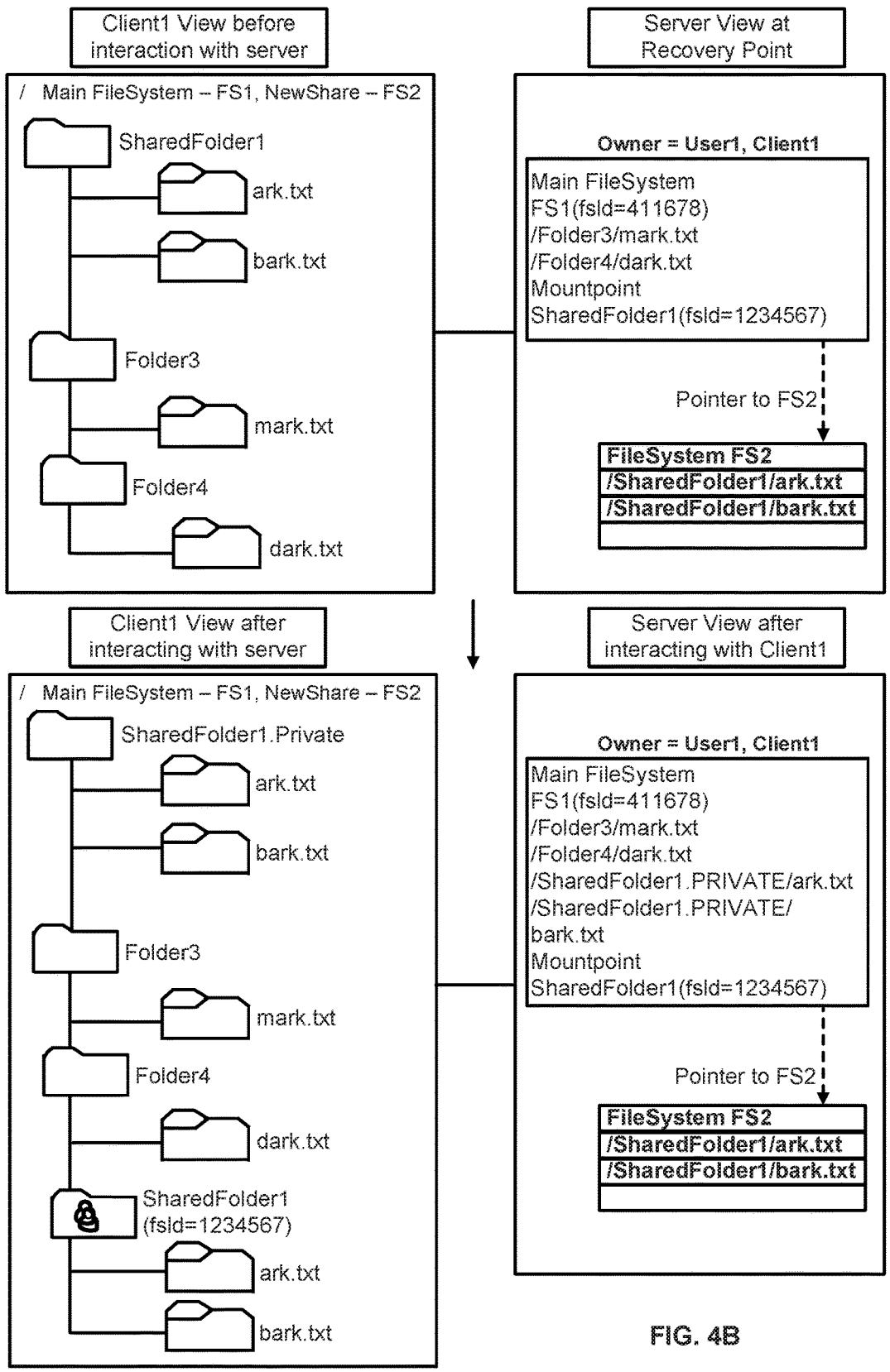
FIGS. 4B and 4C illustrate examples of the flowchart execution in accordance with an example implementation.
Figure 4C:
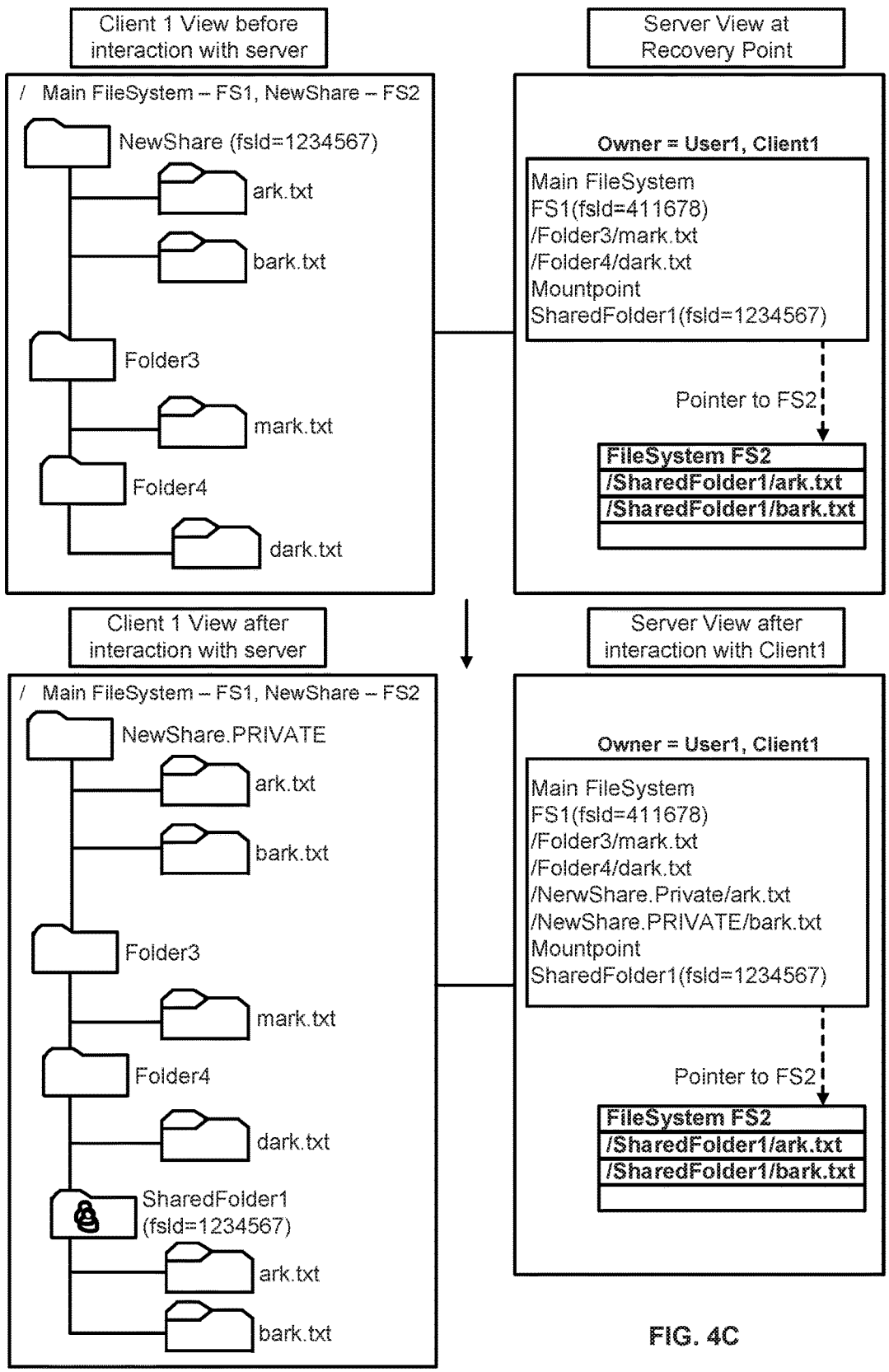

FIGS. 4B and 4C illustrate examples of the flowchart execution in accordance with an example implementation. In the example of FIG. 4B, the recovery point is the state of the server data after the restore from the backup has completed. Client1 has a private folder named SharedFolder1 and does not have any shared folders. For User1, Client1 communicates with the server and the server indicates that it is in the recovery mode. The client compares the mount point metadata in the local mount point table with the mount point metadata in the server table on the server. Mount point name SharedFolder1 on the server is not present on client, but client has a private folder with same name. Without the renaming implementations as described in the present disclosure, the server may start sharing all private contents of user's private folder "SharedFolder1". To avoid that situation, the client renames private folder "SharedFolder1" to "SharedFolder1.PRIVATE". The client also pulls mount point SharedFolder1 details from the server.

In the example of FIG. 4C, the recovery point is the state of the server's data after the restore from backup has completed. Client1 renames its shared folder mount point from "SharedFolder1" to "NewShare" at a certain time before a disaster occurs, and that is the current state of client1. Client1 for User1 communicates with the server and the server indicates that it is in the recovery mode. Client1 compares the mount point metadata in the local mount point table with the mount point metadata on the server in the server table. The mount point name (path of the mount point) "SharedFolder1" on server is different from the mount point name (path of the mount point) "NewShare" on the client. Therefore, "NewShare" is made into a private folder and its new name is "NewShare.PRIVATE".

In the above example, the mount point name is one example of the metadata used. Similar renaming may also occur when the share identifier is different for a folder with the same path.

Example Implementations of Recovery Put and Recovery Update

When the client sends files for recovery, the client uses a REST PUT operation. During this operation, there can be two possibilities for the files: they are either exactly the same contents as when they were synchronized, or they have been modified by the user locally after the files has been synchronized. The first case will be referred to as PUT, and the second case will be referred to as UPDATE. More specifically, the recovery process of PUT can be used if the current metadata (e.g. size and/or modification time) associated with the file had not changed from what the client had recorded in its local database (e.g. file had not changed locally since the last synchronization with the server). The recovery process of UPDATE can be used if the file has changed locally since the last synchronization to server, (e.g. user updated the file locally while the server was down and not accepting uploads). When the server becomes available (e.g. recovers from a failure) and informs the client of the recovery, the client sends the locally changed file as an UPDATE since the file has changed locally since the last successful synchronization with the server. The difference between PUT and UPDATE is whether the file has been changed locally since the last time the client synchronized with the server. In each case the server attempts to restore itself using the data from the client.

In the following examples, the ClientVersion is the version sent by the client in the PUT or UPDATE. The ServerVersion is the version of the file on the server.

When the server goes through recovery, each file system is marked with a RecoveryVersion, and the RecoveryVersion is not changed during the recovery. This RecoveryVersion is set as a version that is higher than the highest Version of all the files on the File system at the start of the recovery of FIG. 5A. During recovery, any encountered ClientVersion that is greater than or equal to the RecoveryVersion indicates to the system that the encountered higher ClientVersion was created after the backup restoration from the server. ClientVersion, RecoveryVersion, and ServerVersion can be implemented as metadata indicating the file version number, or by other methods depending on the desired implementation.

With the following implementation, it can thereby be possible to accept all the file contents on the server with fewer conflict files created. In related art implementations, conflict files would be created whenever the ClientVersion did not match the ServerVersion. However, by utilizing the recovery put, the example implementation allows the first update to a file after the Server Recovery to succeed. The example implementations as depicted in FIGS. 5A and 5B illustrate a reconciliation process by the server between the server and the client. Before starting the processes as illustrated in FIGS. 5A and 5B, the server refers to a recovery flag for each file which is sent from each client, and determines whether a client requests a recovery process of PUT or UPDATE for each file. As described above, the recovery flag can include values 'recoveryPut' (PUT) or 'recoveryUpdate' (UPDATE) depending on whether or not the file had local changes since the last time it was in synchronization with the server.

FIG. 5A illustrates the flowchart for a recovery PUT, in accordance with an example implementation. The recovery PUT can be in the form of a client recovery file as described above. The server receives a file PUT from the client (500) to obtain the ClientVersion. A comparison is performed to ascertain if the ClientVersion is newer than the RecoveryVersion (501). If not (No) then the PUT is ignored (502), because the ClientVersion is a version before the highest version which can be recovered by using files in the server and the external storage, so the server is already up to date (server already has the client version), and the PUT can thereby be discarded.

Otherwise (Yes) a check is performed (503) to ascertain if the ServerVersion is null (i.e. the Server does not have a copy). If the ServerVersion is null (Yes) then the PUT is executed to store the file as a new file (504), as the file does not exist on the server. Otherwise (No) a check is performed (505) to ascertain if the ServerVersion is older than the RecoveryVersion. If the ServerVersion is older than the RecoveryVersion (Yes in 505), it indicates that the Server has not yet received another file, which has a ClientVersion newer than the RecoveryVersion, from a client. If the ServerVersion is newer than the RecoveryVersion (No in 505), it indicates that the Server already receives another file, which has a ClientVersion newer than the Recovery Version, from a client.

If the ServerVersion is older than the RecoveryVersion (Yes), then the PUT is processed as an update to the existing file (506) by using the file received from a client. The file from the client is thus used to become the newest version of the file on the server, and set to be a version that is higher than all of the other versions stored on the clients at that moment. This is done to designate the file received as the latest version, and to process subsequent file PUTS from clients for this file to be conflict files. Otherwise (No), a check is performed (507) to ascertain if the client and server file have the same hash, which indicates that they have the same contents.

If the client and the server files have the same hash (Yes) then the PUT is ignored (508) and can be discarded. The client will pull the new information for the file after the client completes the recovery. Otherwise (No), a conflict file is created with the client file (509), as another client has already updated the file after recovery and it may not be possible to determine how the update fits into the history of the file. In one example implementation, the server can create the conflict file in a folder which stores conflicted files. Thus, the server can put the conflict files in the same directory as the original file.

By this recovery process described in the example implementations above, if the server receives a plurality of files having a newer version than a server version at a recovery point, the server manages one of the plural file as the updated file with a new version, and other files as conflict files to the first file. The recovery point is the state of the server's data after the restore from backup of storage 260 and external storage 250 has completed. The first file is a file which the server receives first among the plural files.

By this recovery process as described in the example implementations above, the server can recover the files by using files stored in not only the internal/external storage of the server but also the memory in the client. Moreover, the server can resolve the conflict among files in the plurality of clients.

FIG. 5B illustrates the flowchart for a recovery UPDATE, in accordance with an example implementation. As described above, the recovery UPDATE can be implemented in the form of an updated client file. For an example implementation of the recovery UPDATE, if there are multiple clients having a file version that is newer than the file version in the server, then the server is configured to treat one of the client versions as the updated version and another client version as the conflict version. Moreover, even if the server has a file of a version which is the same version of a client file UPDATE, the server need to update the file in the server by using the client file UPDATE.

In the example implementation of the file UPDATE, the server receives a file UPDATE from the client (510). A check is performed (511) to ascertain if the ServerVersion is null, thereby indicating that the server does not have a copy of the file. If the ServerVersion is null (Yes), then the file UPDATE is allowed (512) as a new PUT to add the file as a new file in the server.

If the ServerVersion is not null (No), then a check is performed (513) to ascertain if the ClientVersion is the same as the ServerVersion. If the ClientVersion is the same as the ServerVersion (Yes) then a check is performed (514) to determine if the ServerVersion is older than the RecoveryVersion. If the ServerVersion is older than the Recovery-Version (Yes), then the UPDATE of existing file is allowed (515), as the operation is a standard update to an existing file. Otherwise (No), the ClientVersion is a version that the server lost when it rolled back, and thus the ClientVersion is newer than the RecoveryVersion at rollback (516).

Otherwise if the ClientVersion is not the same as the ServerVersion, a check is performed (517) to ascertain if the ServerVersion is older than the RecoveryVersion and the ClientVersion is newer than the RecoveryVersion. If so (Yes), then the result is that the ClientVersion is the first update to the file after recovery, so the UPDATE is allowed (518) to update the existing file in the server with the new ClientVersion. Otherwise (No), a conflict file is created (519).

Figure 5C:
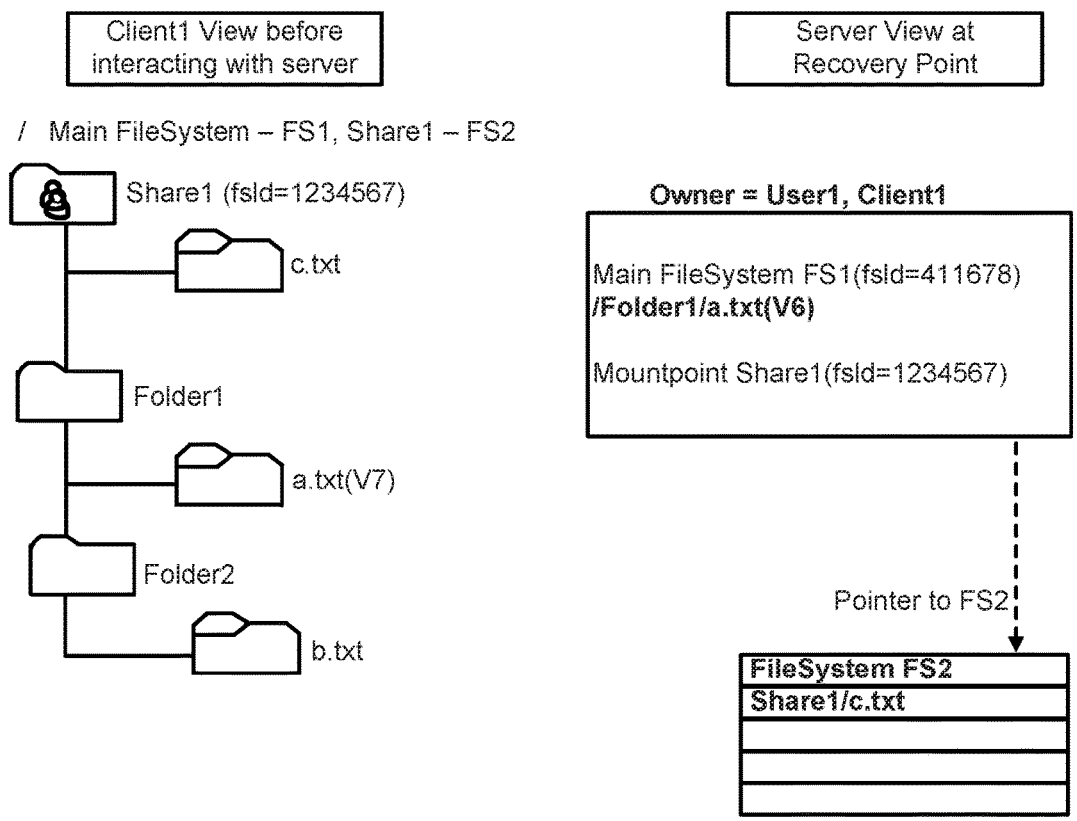
FIGS. 5C and 5D illustrate an example interaction between the client and server based on the example implementations of FIGS. 5A and 5B.
Figure 5D:
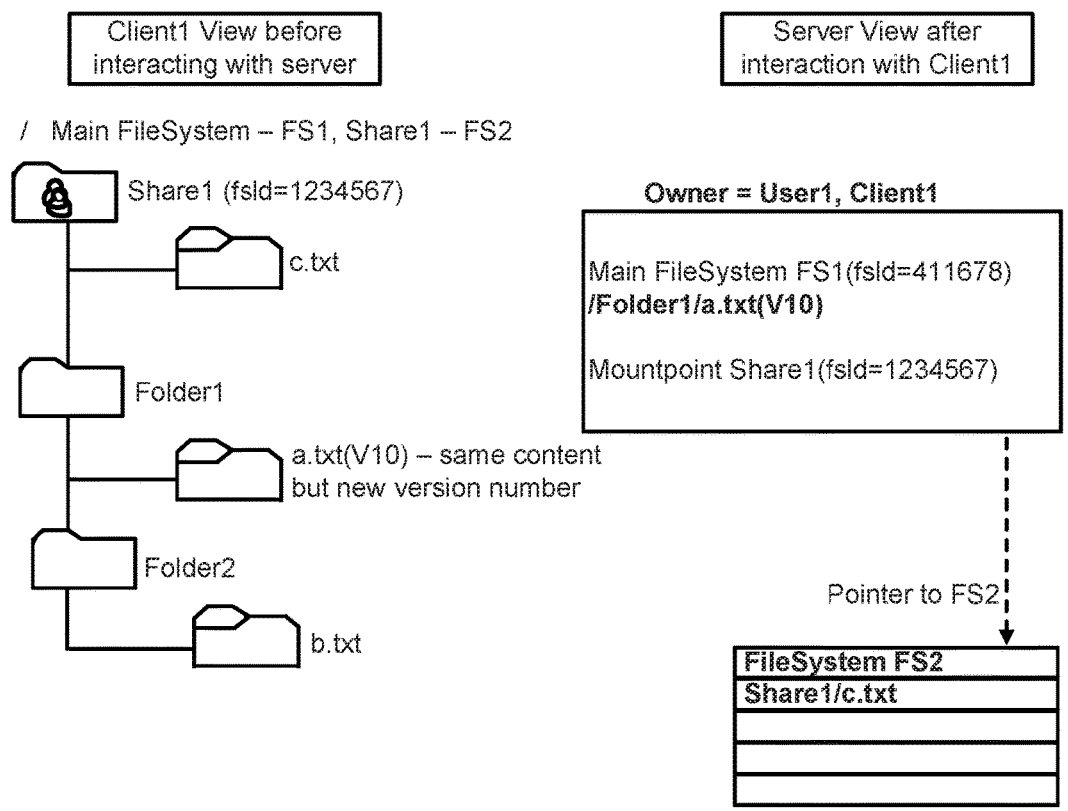

FIGS. 5C and 5D illustrate an example interaction between a client and a server based on the example implementations of FIGS. 5A and 5B. Specifically, FIGS. 5C and 5D illustrate an example interaction that occurs when the client has a version that the server has lost. Thus, the example interaction can occur for either the recovery PUT or the recovery UPDATE as illustrated in FIGS. 5A and 5B.

In FIG. 5C, the user has three registered clients. The server is at recovery point and attempts to recover lost data from the clients. At the recovery points, the ServerVersion of file a.txt is V6, and the RecoveryVersion is V7. The Client-Versions of file a.txt on Client1 is V7, Client2 is V8, and Client3 is V5. Client1 communicates with the server. In FIG. 5D, the server realizes from the interaction with Client1 that it has an older version of a.txt, so the server updates its version with a new version. In the example of FIG. 5D, server creates ServerVersion V10, which is a version that is higher than all of the other client versions, while Recovery-Version remains as V7. The ServerVersion is set to the highest version to handle situations for creating conflict files when files are edited locally on the client side while the Server is still performing synchronization with the client. Although the version name will not be the same as on client, the content will be the same. Thus, the ServerVersion V10 has the same content as V7 on client1 and the server sends ServerVersion V10 to client1. The view of Client1 remains the same but the version number of file a.txt is now V10, although the contents remain the same as the previous ClientVersion V7. FIG. 5D illustrates the views in the client and server after the client/server interaction.

Figure 5E:
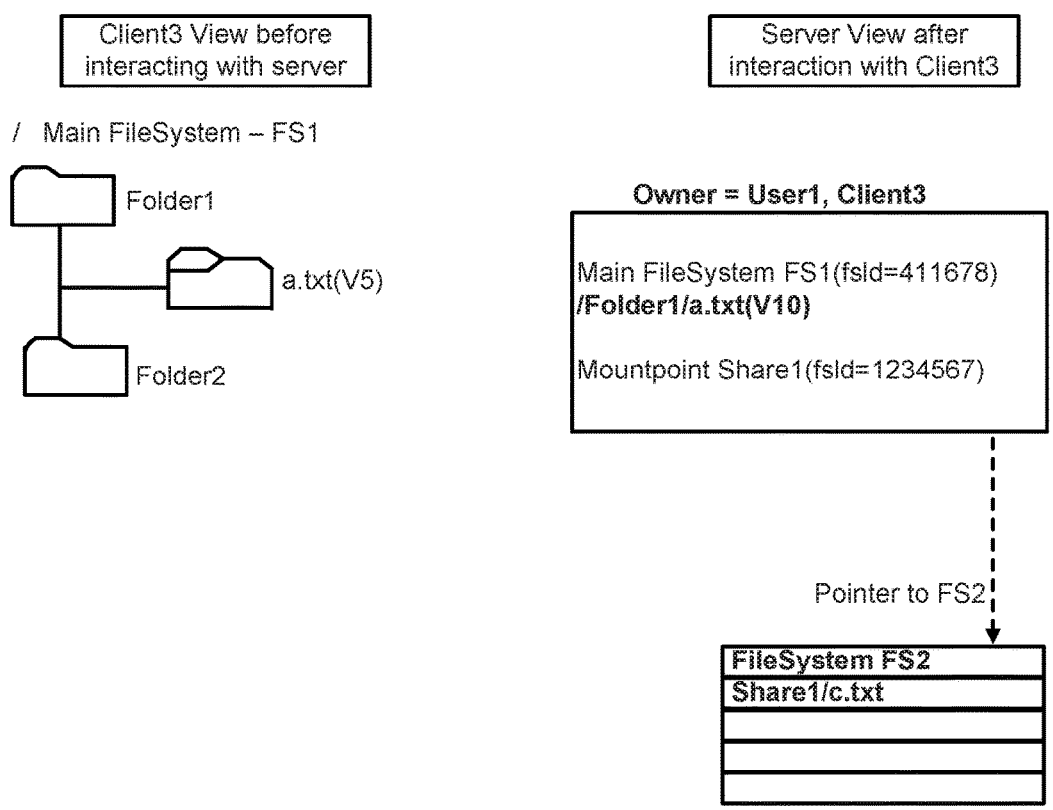
FIGS. 5E and 5F illustrate an example interaction between a client and a server based on the example implementations of FIG. 5A.
Figure 5F:
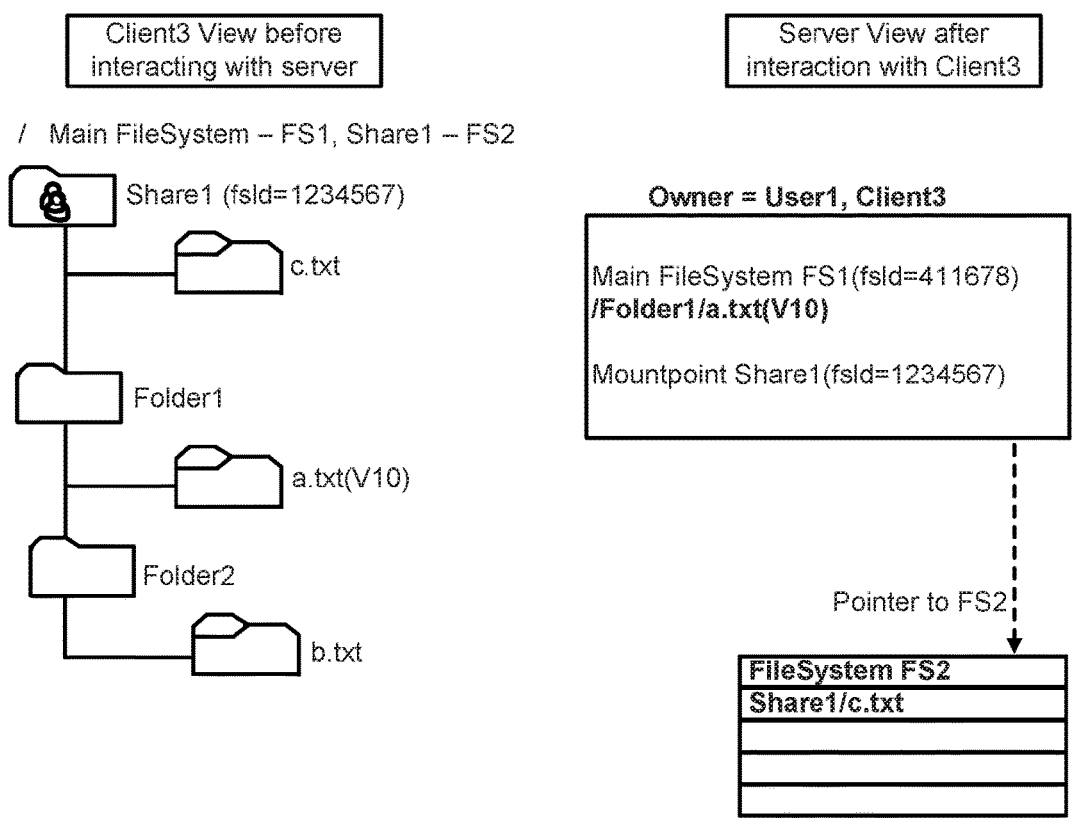

FIGS. 5E and 5F illustrate an example interaction between a client and a server based on the example implementations of FIG. 5A. Specifically, FIGS. 5E and 5F illustrate an example interaction for a recovery PUT due to an interaction from Client3 after the interaction of FIGS. 5C and 5D. In FIG. 5E, Client3 has version 5 (V5) of file a.txt and Client3 does not have shared folder mount point "Share1" and has no file under "Folder2". The server view is the view after the interaction with Client1 from FIG. 5D. From that perspective, Client3 interacts with the server as illustrated in FIG. 5E. In FIG. 5F, the server realizes that it has a newer version of a.txt than Client3, so the server sends the current server version (V10) of a.txt to Client3. The client also pulls details of "Share1" and "Folder2" to be synced to client3, resulting in the views as depicted in FIG. 5F.

Figure 5G:
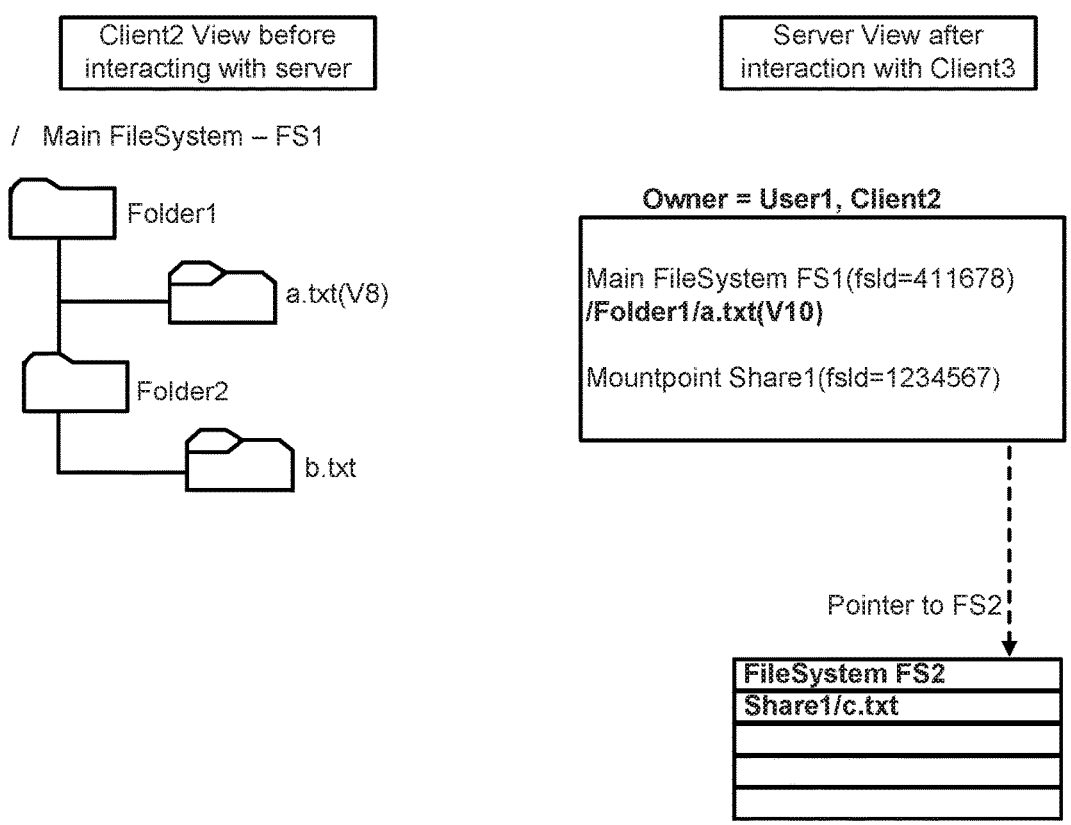
FIGS. 5G and 5H illustrate an example interaction between a client and a server based on the example implementations of FIGS. 5A and 5B.
Figure 5H:
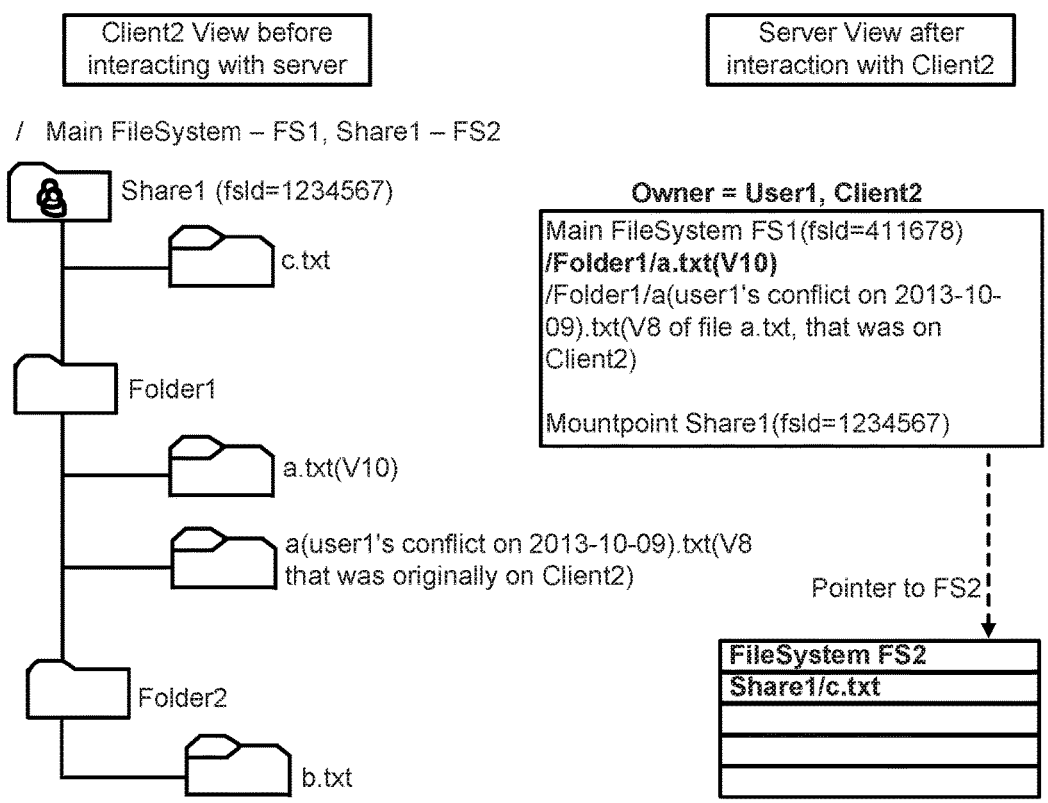

FIGS. 5G and 5H illustrate an example interaction between a client and a server based on the example implementations of FIGS. 5A and 5B. Specifically, FIGS. 5G and 5H illustrate an example interaction that occurs when Client2 sends a subsequent new client version after the interaction as illustrated in FIGS. 5E and 5F. Thus, the example interaction can occur for either the recovery PUT or the recovery UPDATE as illustrated in FIGS. 5A and 5B.

In the example of FIG. 5G, Client2 has version 8 (V8) of file a.txt and Client2 does not have shared folder mount point "Share1". The server view is the view after the interaction with Client3 from FIG. 5F. Client2 interacts with server in FIG. 5G. In FIG. 5H, the server realizes it has an older version of a.txt than Client2, because the Recovery Version V7 is older than the ClientVersion V8 of Client2. However, the server has already recovered its data once (e.g. due to ServerVersion being set at V10), so the server generates a conflict for that file. The client pulls details of the created conflict file and the existing version of a.txt to Client2. The client also pulls details of "Share1" to be synched to Client2. The resulting views for Client2 and server are illustrated in FIG. 5H.

Finally, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A server comprising:
   an interface configured to interface with a plurality of client devices;
   a memory configured to store information regarding a version of a first file managed by the server at a recovery point, and
   a processor configured to:
      receive a plurality of files from the plurality of client devices to recover files in the server by using the plurality of files in the plurality of client devices, and
      for a second file of the plurality of received files having a newer version than the version of the first file at the recovery point, manage the second file as a new version of the first file.

2. The server of claim 1, wherein the processor is further configured to receive one or more updates to the first file from one of the plurality of client devices while receiving a plurality of files from the plurality of client devices to recover files in the server, wherein the one or more updates to the first file is stored as a conflict file for the one or more updates having a same version as the new version of the first file.

3. The server of claim 1, wherein the processor is further configured to receive one or more updates to the first file from one of the plurality of client devices while receiving a plurality of files from the plurality of client devices to recover files in the server, wherein the one or more updates to the first file is stored as a conflict file for the one or more updates having:
   a different version from the new version of the first file; and
   a version that is not newer than the version of the first file.

4. The server of claim 1, wherein the processor is configured to:

store ones of the plurality of files as a new file for the ones of the plurality of files that do not have a corresponding one of the files in the server; and store updates as a new file for ones of the updates do not have a corresponding one of the files in the server.

5. The server of claim 1, wherein the processor is configured to:

receive one or more updates to the first file from one of the plurality of client devices while receiving a plurality of files from the plurality of client devices to recover files in the server, wherein the one or more updates to the first file is used to update the first file before the second file is managed as the new version of the first file.

6. The server of claim 1, wherein the processor is configured to:

discard received ones of the plurality of files from the plurality of client devices having a corresponding one of the files in the server that is a newer version than the received ones.

7. The server of claim 1, wherein the processor is further configured to, for a third file of the plurality of received files having a newer version than the version of the first file at the recovery point, manage the third file as a conflict file to the second file.

8. A method for managing a server, comprising:

storing information regarding a version of a first file managed by the server at a recovery point, receiving a plurality of files from the plurality of client devices to recover files in the server by using the plurality of files in the plurality of client devices, for a second file of the plurality of received files having a newer version than the version of the first file at the recovery point, managing the second file as a new version of the first file.

9. The method of claim 8, further comprising receiving one or more updates to the first file from one of the plurality of client devices while receiving a plurality of files from the plurality of client devices to recover files in the server, wherein the one or more updates to the first file is stored as a conflict file for the one or more updates having a same version as the new version of the first file.

10. The method of claim 8, further comprising receiving one or more updates to the first file from one of the plurality of client devices while receiving a plurality of files from the plurality of client devices to recover files in the server, wherein the one or more updates to the first file is stored as a conflict file for the one or more updates having:

a different version from the new version of the first file; and a version that is not newer than the version of the first file.

11. The method of claim 8, further comprising storing ones of the plurality of files as a new file for the ones of the plurality of files that do not have a corresponding one of the files in the server; and storing updates as a new file for ones of the updates do not have a corresponding one of the files in the server.

12. The method of claim 8, further comprising receiving one or more updates to the first file from one of the plurality of client devices while receiving a plurality of files from the plurality of client devices to recover files in the server, wherein the one or more updates to the first file is used to update the first file before the second file is managed as the new version of the first file.

13. The method of claim 8, further comprising discarding received ones of the plurality of files from the plurality of client devices having a corresponding one of the files in the server that is a newer version than the received ones.

14. The method of claim 8, further comprising, for a third file of the plurality of received files having a newer version than the version of the first file at the recovery point, managing the third file as a conflict file to the second file.

* * * * *